(12) United States Patent
Fujimaki (10) Patent No.: US 8,287,140 B2
(45) Date of Patent: Oct. 16, 2012

(54) PROJECTOR HAVING A SHIFTABLE MOUNTED LENS

(75) Inventor: Osamu Fujimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 12/697,497

(22) Filed: Feb. 1, 2010

(65) Prior Publication Data

US 2010/0195063 A1     Aug. 5, 2010

(30) Foreign Application Priority Data

Feb. 5, 2009    (JP) ................................ 2009-024572

(51) Int. Cl.
*G03B 21/14*      (2006.01)
(52) U.S. Cl. ...................................... 353/100; 353/101
(58) Field of Classification Search ............... 353/69, 353/70, 100, 101, 121, 122; 359/694, 696, 359/967, 813, 822, 823, 827, 828, 829, 830
See application file for complete search history.

(56) References Cited

U.S. PATENT DOCUMENTS 6,364,491 B1 * 4/2002 Okada et al. ................. 353/101
6,592,228 B1 * 7/2003 Kawashima et al. ......... 353/101
7,508,603 B2 * 3/2009 Masuda ........................ 359/813

FOREIGN PATENT DOCUMENTS

JP     A-2008-58673     3/2008

* cited by examiner

*Primary Examiner* — Francis M Legasse, Jr.
*Assistant Examiner* — Bao-Luan Le
(74) *Attorney, Agent, or Firm* — Oliff & Berridge, PLC (57) ABSTRACT

A projector includes: a light valve configured to modulate light emitted from a light source according to image information to form image light; a support and drive unit configured to support a projection lens for projecting the image light formed by the light valve such that the projection lens can be replaced, and shift a mounted lens as the supported projection lens in a first direction within a plane perpendicular to a system optical axis of the entire projector; and a control unit configured to determine information concerning an allowable range of the shift of the mounted lens in the first direction, and control the operation of the support and drive unit such that the shift of the mounted lens lies within the determined allowable range.

9 Claims, 5 Drawing Sheets

PROJECTOR HAVING A SHIFTABLE MOUNTED LENS

BACKGROUND

1. Technical Field

The present invention relates a projector which projects an image formed by a light valve such as a liquid crystal panel onto a screen.

2. Related Art

A projector which has a base unit for fixing a projection lens in a detachable manner and shifts the projection lens in the up-down and left-right directions by using a lens shift member provided on the base unit is known (see JP-A-2008-58673).

According to this projector, however, the same operation as that performed by the projector including the projection lens suited for lens shift is executed even when the projector includes a projection lens not suited for lens shift. That is, the similar lens shift operation is performed regardless of the types of the projection lens fixed to the base unit. In this case, problems such as darkness and loss of the peripheral area of a projection image arise when the lens shift operation is performed for the projection lens not suited for lens shift after lens replacement. Even when the projection lens is suited for lens shift, the uniform lens shift operation may be inappropriate for a particular type of the projection lens due to the limited proper range of the shift amount.

SUMMARY

It is an advantage of some aspects of the invention to provide a projector to which various types of projection lens containing a projection lens suited for lens shift are attachable, and can operate without causing operational problems when the various types of projection lens are attached to the projector.

A projector according to an aspect of the invention includes: a light valve which modulates light emitted from a light source according to image information to form image light; a support and drive unit which supports a projection lens for projecting the image light formed by the light valve such that the projection lens can be replaced, and shifts a mounted lens as the supported projection lens in a first direction within a plane perpendicular to a system optical axis of the entire projector; and a control unit which determines information concerning an allowable range of the shift of the mounted lens in the first direction, and controls the operation of the support and drive unit such that the shift of the mounted lens lies within the determined allowable range.

According to this projector, the control unit determines information concerning the allowable range of the shift of the mounted lens in the first direction, and controls the operation of the support and drive unit such that the shift of the mounted lens lies within the determined allowable range. Thus, the support and drive unit can be operated in accordance with the allowable range of the mounted lens, and the projection of the image by various types of the mounted lens can be appropriately controlled.

In a specific aspect or embodiment, the projector may be configured such that the support and drive unit switches between a normal condition for disposing the mounted lens in such a position that the optical axis of the mounted lens lies on the system optical axis and a shift condition for disposing the mounted lens in such a position that the optical axis of the mounted lens shifts in the first direction from the system optical axis. The control unit determines the type of the mounted lens between a shift type so designed as to control a projection direction of a projection image by shifting in the first direction and a non-shift type not so designed as to control the projection direction of the projection image as information concerning the allowable range. When determining that the mounted lens is the shift type, the control unit allows the support and drive unit to switch the condition of the mounted lens from the normal condition to the shift condition. When determining that the mounted lens is the non-shift type, the control unit does not allow the support and drive unit to switch the condition of the mounted lens from the normal condition to the shift condition. According to this projector, the control unit does not allow the support and drive unit to switch the condition of the mounted lens from the normal condition to the shift condition when determining that the mounted lens is the non-shift type. In this case, inappropriate lens shift of the non-shift type mounted lens is not executed, and thus problems in display such as darkness and loss of the periphery of the projection image are not caused.

In another aspect of the invention, the projector may be configured such that the control unit causes the support and drive unit to switch the condition of the mounted lens from the shift condition to the normal condition when determining that the mounted lens as the non-shift type is in the shift condition. In this case, the non-shift type mounted lens can be forced to return to the proper normal condition, and thus the function for maintaining the operation of the projector in appropriate condition can be improved.

In still another aspect of the invention, the projector may be configured such that the support and drive unit has a sensor which automatically detects the type of the mounted lens between the shift type and the non-shift type. In this case, the problems of darkness and loss of the periphery of the projection image can be automatically prevented.

In yet another aspect of the invention, the projector may be configured such that the support and drive unit has an electric connector contacting the mounted lens as the sensor, and that the control unit determines the type of the mounted lens between the shift type and the non-shift type based on the electric condition of the electric connector. In this case, the lens type can be easily detected and determined by using the electric connector.

In still yet another aspect of the invention, the projector may be configured such that the control unit determines that the mounted lens is the non-shift type when a terminal provided on the electric connector for specifying the type of the mounted lens is opened or short-circuited.

In further another aspect of the invention, the projector may be configured such that the support and drive unit has a contact set including four terminals which can contact the mounted lens as the electric connector. When the mounted lens is the shift type, the mounted lens can perform at least either zooming or focusing in response to a control signal received from three terminals of the contact set. When the mounted lens is the shift type, information associated with the shift type is retained in the one terminal of the contact set other than the three terminals through which the control signal is received. In this case, whether the lens shift is executed or not can be determined based on whether the mounted lens is the shift type or not. Also, zooming and focusing of the mounted lens can be performed under the control of the control unit.

BRIEF DESCRIPTION OF THE DRAWINGS

The invention will be described with reference to the accompanying drawings, wherein like numbers reference like elements.

DESCRIPTION OF EXEMPLARY EMBODIMENT

A projector according to an embodiment of the invention is hereinafter described with reference to FIGS. 1 and 2.

A projector 10 in this embodiment includes a main optical device 11 called an optical engine unit as well, a circuit device 17 for controlling the overall operation of the projector, and an outer case 19 for covering the entire projector. FIG. 1 does not show the circuit device 17, and FIG. 2 does not show the main optical device 11 and others.

Figure 1:
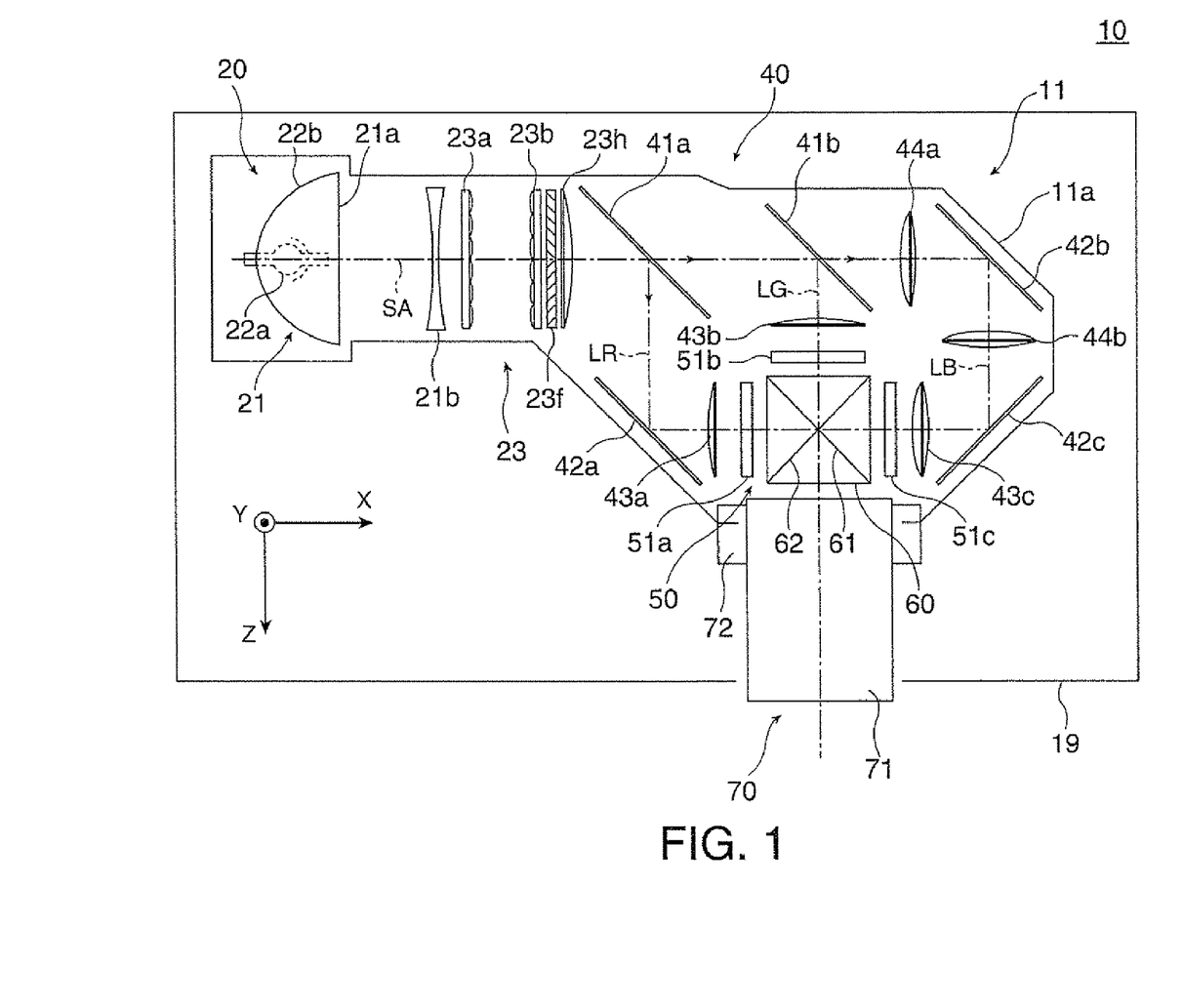
FIG. 1 is a plan view illustrating optical systems of a projector according to an embodiment.

The main optical device 11 shown in FIG. 1 has an illumination device 20, a color separation and light guide system 40, a light modulation unit 50, a cross dichroic prism 60, and a projection unit 70. Almost all parts of the illumination device 20, the color separation and light guide system 40, the light modulation unit 50, the cross dichroic prism 60, and the projection unit 70 are accommodated within a light guide 11a as a light shielding unit.

The illumination device 20 includes a light source lamp unit 21 and an equalizing system 23. The light source lamp unit 21 has a lamp unit 21a and a concave lens 21b as a light source unit. The lamp unit 21a has a lamp main body 22a constituted by a high-pressure mercury lamp or the like, and a concave mirror 22b for collecting light from the light source and releasing the light toward the front. The concave lens 21b has function of converting the light emitted from the light source released from the lamp unit 21a into light traveling substantially parallel with a system optical axis SA, i.e., an illumination optical axis. However, the concave lens 21b can be eliminated when the concave mirror 22b is a parabolic mirror, for example.

The equalizing system 23 has first and second lens arrays 23a and 23b, a polarization converting member 23f, and a superimposing lens 23h. Each of the first and second lens arrays 23a and 23b has a plurality of element lenses disposed in matrix. Light emitted from the light source lamp unit 21 is divided into a plurality of partial lights by the element lenses of the first lens array 23a. Then, the partial lights from the first lens array 23a are released through the element lenses of the second lens array 23b at appropriate diverging angles. The polarization converting member 23f having a prism array of PBS or the like converts the light emitted from the light source and released from the lens array 23b into only linear polarized light in a particular direction, and supplies the converted light to the subsequent optical system. The superimposing lens 23h generally converges the illumination light having passed the polarization converting member 23f to allow superimposed illumination on liquid crystal light valves 51a, 51b, and 51c in respective colors provided on the light modulation unit 50.

The color separation and light guide system 40 has first and second dichroic mirrors 41a and 41b, reflection mirrors 42a, 42b, and 42c, and three field lenses 43a, 43b, and 43c. The color separation and light guide system 40 separates the illumination light emitted from the illumination device 20 into three color lights in red (R), green (G), and blue (B), and guides the respective color lights to the subsequent liquid crystal light valves 51a, 51b, and 51c. More specifically, the first dichroic mirror 41a reflects illumination light LR in R color of the three color lights in R, G, and B, and transmits the other illumination lights LG and LB in G and B colors. The second dichroic mirror 41b reflects the illumination light LG in G color of the two color lights in G and B, and transmits the illumination light LB in B color. In the color separation and light guide system 40, the illumination light LR reflected by the first dichroic mirror 41a passes through the reflection mirror 42a and enters the field lens 43a for incident angle control. The illumination light LG transmitted by the first dichroic mirror 41a and reflected by the second dichroic mirror 41b enters the field lens 43b for incident angle control. The illumination light LB transmitted by the second dichroic mirror 41b passes through relay lenses 44a and 44b and reflection mirrors 42b and 42c and enters the field lens 43c for incident angle control.

The light modulation unit 50 has the three liquid crystal light valves 51a, 51b, and 51c to which the three illumination lights LR, LG, and LB are supplied, respectively. Though not shown in the figures, each of the liquid crystal light valves 51a, 51b, and 51c includes a liquid crystal panel disposed at the center and a pair of entrance side and exit side polarization filters between which the liquid crystal panel is sandwiched. The spatial distributions in the polarization direction contained in the illumination lights LR, LG, and LB having entered through the entrance side polarization filters are varied by the liquid crystal light valves 51a, 51b, and 51c. More specifically, the polarization conditions of the respective color lights LR, LG, and LB having entered the liquid crystal light valves 51a, 51b, and 51c are controlled by pixel according to drive signals or control signals inputted to the liquid crystal light valves 51a, 51b, and 51c as electric signals. Then, the intensities of the color lights LR, LG, and LB are modulated by pixel while the color lights LR, LG, and LB are passing through the not-shown exit side polarization filters.

The cross dichroic prism 60 is a light combining system for producing a color image by combined lights. The cross dichroic prism 60 contains a first dichroic film 61 for reflecting the R light and a second dichroic film 62 for reflecting the B light disposed in an X shape in the plan view. The cross dichroic prism 60 reflects the red light LR coming from the liquid crystal light valve 51a such that the red light LR can be released to the right with respect to the traveling direction by using the first dichroic film 61, directs the green light LG coming from the liquid crystal light valve 51b such that the green light LG can be released in the straight direction by using both of the dichroic films 61 and 62, and reflects the blue light LB coming from the liquid crystal light valve 51c such that the blue light LB can be released to the left with respect to the traveling direction by using the second dichroic film 62.

The projection unit 70 has a mounted lens 71 for projecting image light released from the cross dichroic prism 60, and a support and drive unit 72 for supporting the mounted lens 71. The mounted lens 71 expands the image light produced by the cross dichroic prism 60 and projects the expanded image light on a screen (not shown). The mounted lens 71 is a replaceable projection lens divided into a shift type so designed as to control the projection direction of the projection image by shift in a particular direction within a plane perpendicular to the system optical axis SA, and a non-shift type which cannot shift in this way. That is, the mounted lens 71 is detachably attached to the support and drive unit 72 such that the mounted lens 71 can be replaced with another lens, and as an attachment/detachment mechanism for lens replacement, an engaging member, a positioning member, a lock member, an unlock member and the like are disposed between the mounted lens 71 and the support and drive unit 72, though not described in detail herein. According to this embodiment, the support and drive unit 72 shifts the mounted lens 71 in ±Y direction within an XY plane perpendicular to the system optical axis SA (more specifically, the up-down direction), for example.

Figure 2:
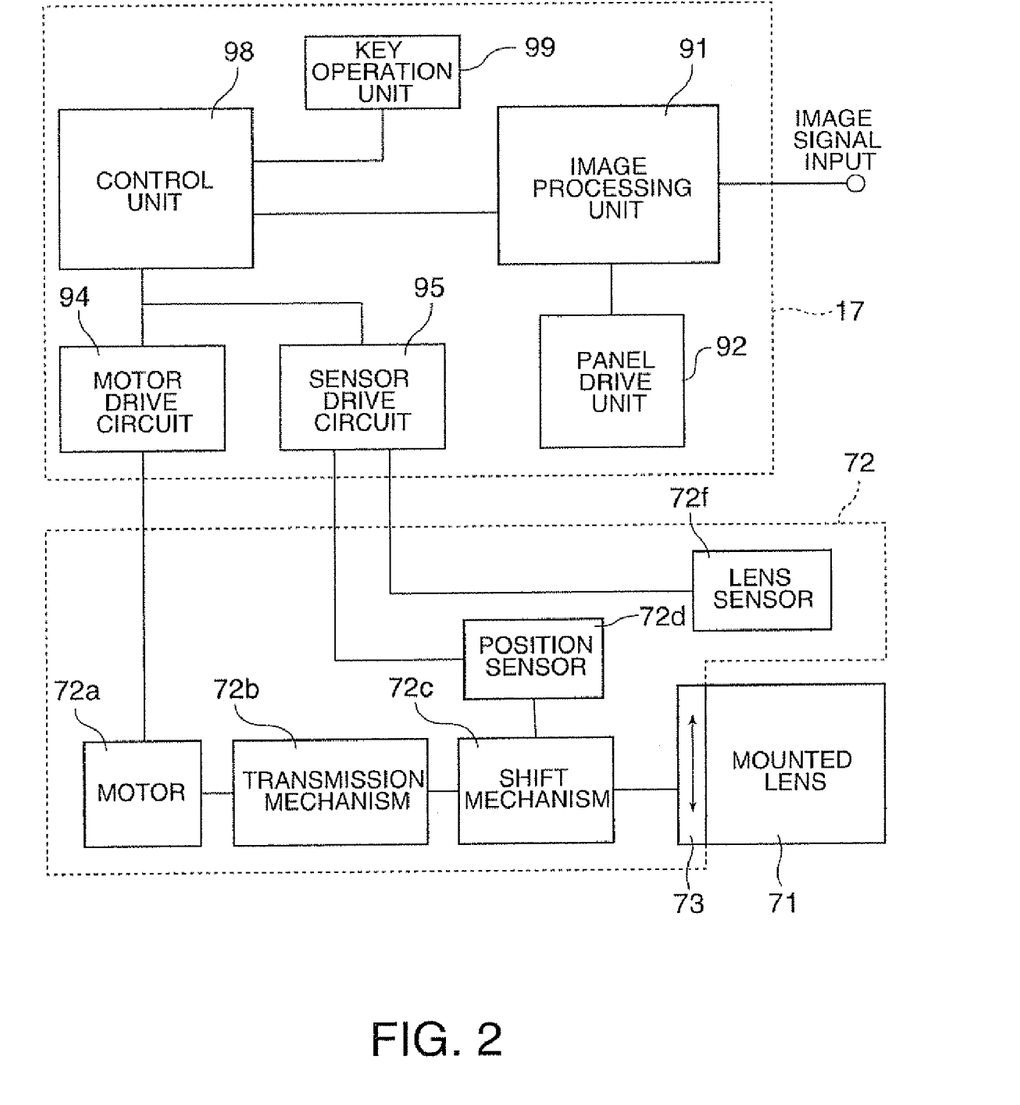
FIG. 2 is a block diagram showing a control system of the projector according to the embodiment.

As illustrated in FIG. 2, the support and drive unit 72 includes a motor 72a, a transmission mechanism 72b, a shift mechanism 72c, a position sensor 72d, and a lens sensor 72f. The motor 72a rotates by a desired amount in a desired direction in response to drive signals from a motor drive circuit 94 provided on the circuit device 17 described in detail later. The transmission mechanism 72b transmits the rotation of the motor 72a to the shift mechanism 72c. The shift mechanism 72c elevates and lowers an up-down shift member 73 to which the mounted lens 71 is attached according to the rotation of the motor 72a. The position sensor 72d has a position information detecting element such as a potentiometer geared to the up-down shift member 73, and outputs detection output corresponding to the position of the up-down shift member 73 to a sensor drive circuit 95 provided on the circuit device 17. The lens sensor 72f has an electric connector incorporated in the up-down shift member 73, and outputs detection output concerning whether the mounted lens 71 provided on the up-down shift member 73 is the shift type or not to the sensor drive circuit 95 of the circuit device 17.

Figure 3A:
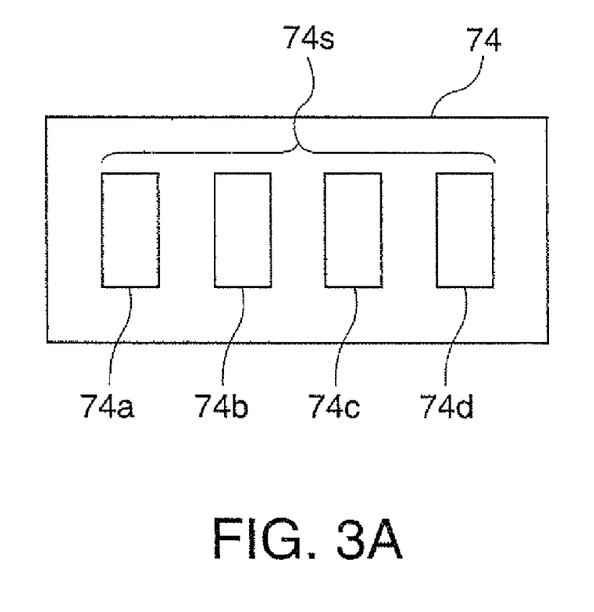
FIGS. 3A and 3B illustrate a structure of an electric connector provided as a sensor.
Figure 3B:
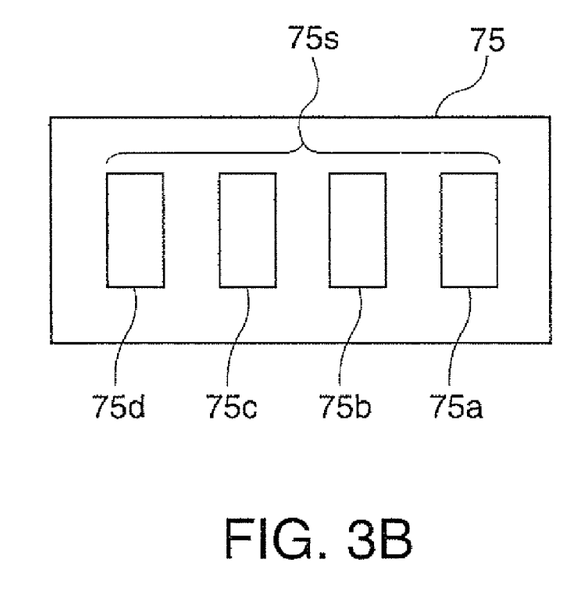

FIG. 3A illustrates the concept of an example of an electric connector included in the lens sensor 72f. FIG. 3B illustrates the concept of an electric connector provided on the mounted lens 71. An electric connector of the lens sensor 72f has a contact set 74s constituted by four terminals 74a, 74b, 74c, and 74d. An electric connector 75 provided on a lens barrel of the mounted lens 71 similarly has a contact set 75s constituted by four terminals 75a, 75b, 75c, and 75d in correspondence with the terminals 74a through 74d. The first terminal 74a of the lens sensor 72f and the first terminal 75a of the mounted lens 71 are common grounding terminals, and are electrically connected with each other when the mounted lens 71 is attached to the support and drive unit 72. The second terminal 74b of the lens sensor 72f and the second terminal 75b of the mounted lens 71 are identifying terminals for lens type detection, and are electrically connected with each other when the mounted lens 71 is attached to the support and drive unit 72. The third terminal 74c of the lens sensor 72f and the third terminal 75c of the mounted lens 71 are zoom signal terminals for zoom drive, and are electrically connected with each other when the mounted lens 71 is attached to the support and drive unit 72. The fourth terminal 74d of the lens sensor 72f and the fourth terminal 75d of the mounted lens 71 are focus signal terminals for focus drive, and are electrically connected with each other when the mounted lens 71 is attached to the support and drive unit 72.

The first terminal 74a of the electric connector 74 detects which type in the shift type and the non-shift type the mounted lens 71 belongs to as an example of information concerning the allowable range of the shift of the mounted lens 71, and is provided as an energizing terminal for detection of resistance and voltage. When the mounted lens 71 is the shift type so designed as to control the projection direction, the first terminal 75a and the second terminal 75b are short-circuited. In this case, substantially no voltage is generated when electricity is supplied between the first terminal 74a and the second terminal 74b of the lens sensor 72f. Based on this condition, it is clarified that the mounted lens 71 is the shift type. On the other hand, in case of the mounted lens 71 which is not the shift type, that is, the non-shift type, the first terminal 75a and the second terminal 75b are not present, or are opened if they are present. In this case, corresponding voltage is generated when electricity is supplied between the first terminal 74a and the second terminal 74b of the lens sensor 72f. Based on this condition, it is clarified that the mounted lens 71 is not the shift type, that is, the non-shift type.

This embodiment can be modified such that the first terminal 75a and the second terminal 75b are opened in case of the shift-type mounted lens 71. According to this modification, the first terminal 75a and the second terminal 75b are short-circuited when the mounted lens 71 is the non-shift type and provided with the terminals 75a and 75b, or the terminals 74a and 74b of the lens sensor 72f are consequently short-circuited by the conductivity of the lens barrel of the mounted lens 71, for example, when the terminals 75a and 75b are not provided.

The third terminal 74c and the fourth terminal 74d of the electric connectors 74 except for the first terminal 74a are connected with a zoom circuit and a focus circuit (not shown) included in the circuit device 17, and used for the drive of a zoom motor and a focus motor (not shown) contained in the mounted lens 71. That is, the third and fourth terminals 75c and 75d of the mounted lens 71 are connected with the zoom motor and the focus motor of the mounted lens 71.

Figure 4:
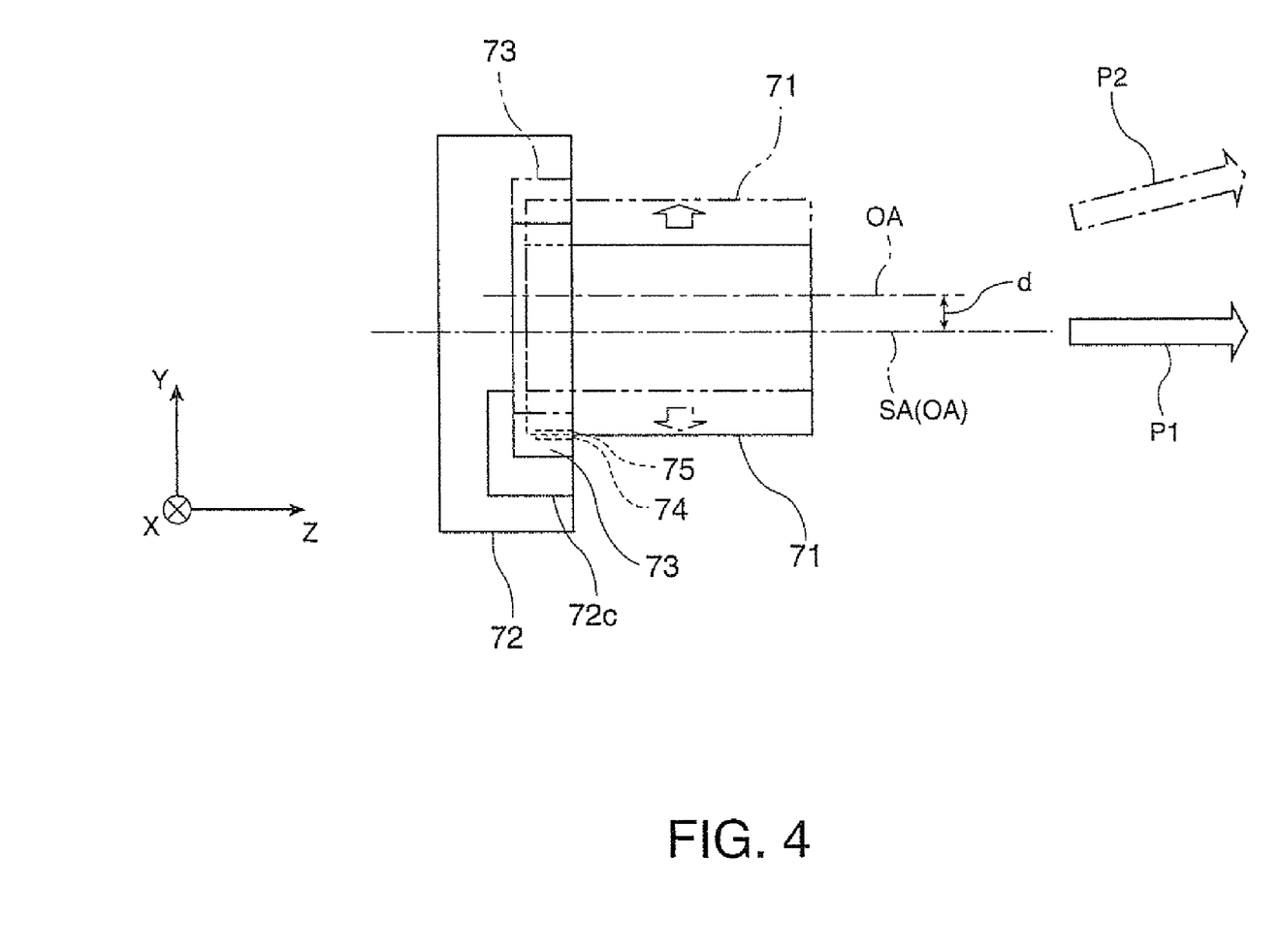
FIG. 4 shows an operation concept of a mounted lens attached to the projector.

When the mounted lens 71 supported by the support and drive unit 72 is the shift type as illustrated in FIG. 4, the support and drive unit 72 operates in response to drive signals transmitted from the motor drive circuit 94 provided on the circuit device 17 shown in FIG. 2 to move the up-down shift member 73 of the shift mechanism 72c upward and downward. By this method, the mounted lens 71 fixed to the up-down shift member 73 is shifted in a first direction (+Y direction in the figure) within the XY plane perpendicular to the system optical axis SA such that the normal condition and the shift condition can be switched. In the normal condition, an optical axis OA of the mounted lens 71 is positioned on the system optical axis SA as indicated by a solid line. In the shift condition, the optical axis OA of the mounted lens 71 shifts from the system optical axis SA by a distance d in the +Y direction within the XY plane perpendicular to the system optical axis SA as indicated by an alternate long and two short dashes line. When the mounted lens 71 is positioned in the normal condition, image light P is emitted from the mounted lens 71 toward the front with the center located on the system optical axis SA. On the other hand, when the mounted lens 71 is positioned in the shift condition, image light P2 is emitted from the mounted lens 71 diagonally upward away from the system optical axis SA.

Returning to FIG. 2, the circuit device 17 has a control unit including an image processing unit 91 to which external image signals such as video signals are inputted, a panel drive unit 92 for driving the liquid crystal light valves 51a, 51b, and 51c based on the output from the image processing unit 91, a motor drive circuit 94 for outputting drive signals to the motor 72a of the support and drive unit 72, a sensor drive circuit for actuating the position sensor 72d and the lens sensor 72f of the support and drive unit 72 to receive detection signals therefrom, a main control unit 98 for controlling the operations of the circuit parts 91, 94, 95 and others, and a function key (key operation unit) 99 operated by a user.

The image processing unit 91 of the circuit device 17 corrects the inputted external image signals, and displays character information and the like in place of the external image signals or by superimposing the character information and the like on the external image signals. The image processing unit 91 changes parameters for keystone correction, gamma correction and the like as necessary when the mounted lens 71 is replaced.

The panel drive unit 92 generates drive signals for controlling the conditions of the liquid crystal light valves 51a, 51b, and 51c based on the image signals outputted from the image processing unit 91 after image processing. These drive signals are used to form images as transmissivity distributions corresponding to the image signals received from the image processing unit 91 on the liquid crystal light valves 51a, 51b, and 51c.

The motor drive circuit 94 operating in response to control signals transmitted from the main control unit rotates the motor 72a of the support and drive unit 72. This rotation actuates the shift mechanism 72c via the transmission mechanism 72b. When the up-down shift member 73 moves in the +Y direction in FIG. 4, for example, the mounted lens 71 fixed to the up-down member switches from the normal condition to the shift condition. When the up-down shift member 73 shifts in the −Y direction in FIG. 4 to return to the origin, the mounted lens 71 fixed to the up-down shift member 73 switches from the shift condition to the normal condition.

The sensor drive circuit 95 outputs data signals corresponding to the position of the up-down shift member 73, that is, the position of the mounted lens 71 in the ±Y direction to the main control unit 98 based on detection signals from the position sensor 72d. The sensor drive circuit 95 also outputs data signals corresponding to the type of the mounted lens 71 fixed to the up-down shift member 73 to the main control unit 98 based on detection signals from the lens sensor 72f. When the detection signal from the lens sensor 72f indicates the short-circuit condition in this embodiment, the lens sensor 72f transmits a data signal indicating that the mounted lens 71 is the shift type to the main control unit 98. On the contrary, when the detection signal from the lens sensor 72f indicates the open condition, the lens sensor 72f transmits a data signal indicating that the mounted lens 71 is the non-shift type to the main control unit 98.

The main control unit 98 includes a microcomputer and others, and operates under a program prepared for controlling the image processing unit 91, the motor drive circuit 94 and others.

An example of control for the operations of the support and drive unit 72 and others is now explained with reference to FIG. 5. The main control unit 98 initially acquires output from the sensor drive circuit 95 at the time of supply of power source, replacement of the projection lens and other timing, and determines whether the mounted lens 71 as the non-shift type is positioned in the shift condition (step S11). More specifically, the main control unit 98 acquires the data signals corresponding to the detection signals from the lens sensor 72f and the position sensor 72d via the sensor drive circuit 95, and determines the type of the mounted lens 71 between the shift type and the non-shift type, and the condition of the mounted lens 71 between the shift condition and the normal condition.

When it is determined that the mounted lens 71 as the non-shift type is positioned in the shift condition in step S11, the main control unit 98 forces the mounted lens 71 to return from the shift condition to the normal condition by operating the support and drive unit 72 (step S12). When the mounted lens 71 is the shift type or positioned in the normal condition, the main control unit 98 maintains the position condition of the mounted lens 71 without operating the support and drive unit 72. According to this example, the mounted lens 71 attached to the support and drive unit 72 has been discussed. When the mounted lens 71 is not attached to the support and drive unit 72, the detection signal from the lens sensor 72f similarly indicates the open condition. In this case, the up-down shift member 73 is disposed at the position corresponding to the normal condition. Thus, projection can be normally performed from the first regardless of the type (shift type or non-shift type) of the projection lens attached next.

Then, the main control unit 98 receives signal input requesting condition transition of the mounted lens 71, more specifically, transition from the normal condition to the shift condition or transition from the shift condition to the normal condition by the user (step S13). For example, when request for transition from the normal condition to the shift condition, or request for transition from the shift condition to the normal condition is inputted from the user by operation of the function key 99, the signal data corresponding to this request is temporarily stored in a memory unit (not shown) of the main control unit 98.

Then, the main control unit 98 acquires the output from the sensor drive circuit 95 to determine the type of the mounted lens 71 between the shift type and the non-shift type (step S14).

When it is determined that the mounted lens 71 is the shift type (step S14: Y), the main control unit 98 operates the support and drive unit 72 to switch the condition of the mounted lens 71 from the normal condition to the shift condition or from the shift condition to the normal condition according to the request of transition inputted in step S13 (step S15). When the mounted lens 71 is the non-shift type (step S14: N), the main control unit 98 suspends operation of the support and drive unit 72 and maintains the condition of the mounted lens 71 (step S16).

The main control unit 98 returns to step S13 after completion of the operations in steps S15 and S16 and receives signal input requesting condition transition by the user (step S13) until the end of operation is requested by power-off, replacement of the lens or other circumstances (step S23: Y).

Figure 5:
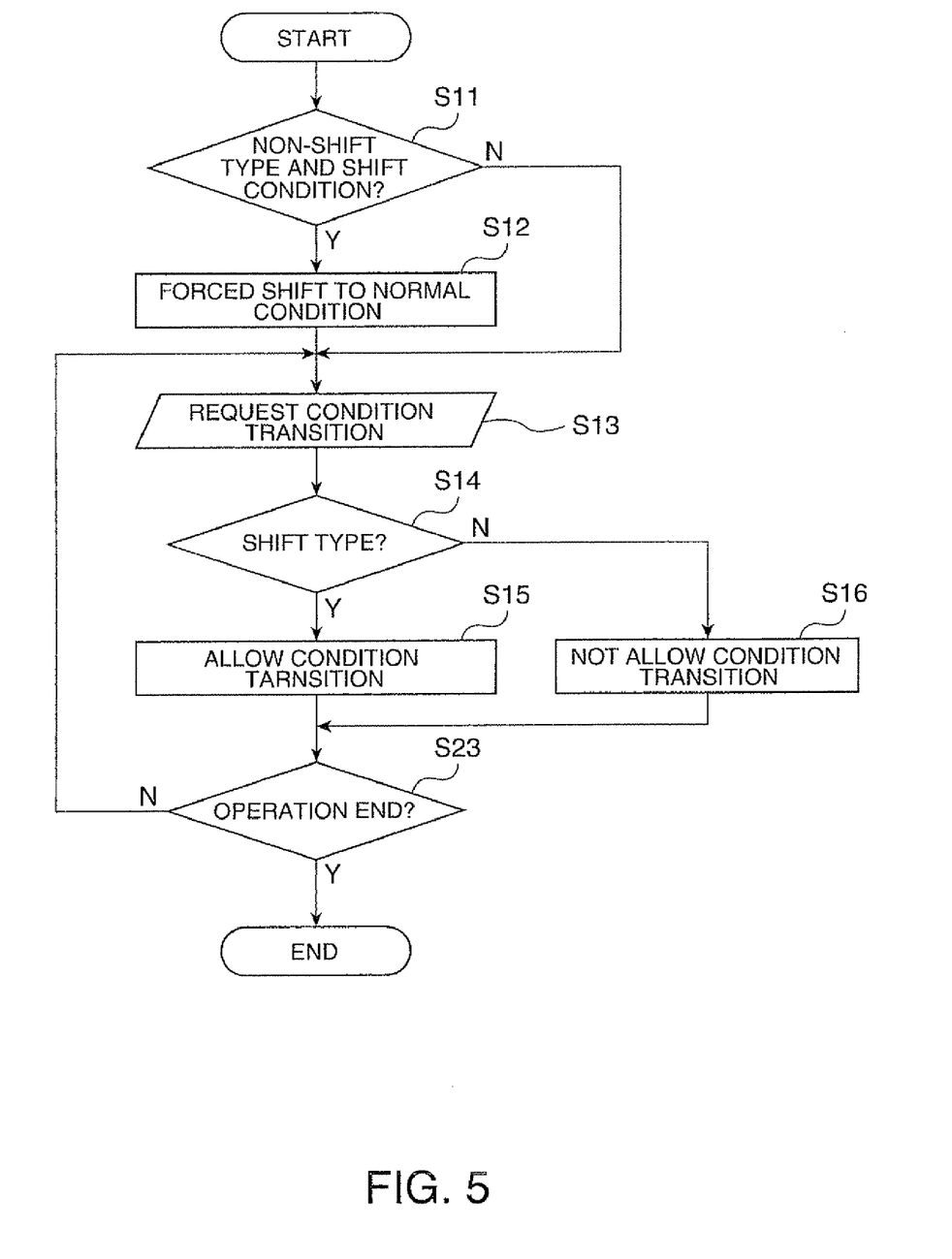
FIG. 5 is a flowchart showing the operation of the projector.

According to the operation shown in FIG. 5, the support and drive unit 72 does not particularly operate when the mounted lens 71 is removed during operation of the projector 10. However, the up-down shift member 73 not holding the mounted lens 71 may be returned to the normal condition to prepare for the mounted lens 71 to be attached next by detecting removal of the mounted lens 71 via the electric connector 74 when the mounted lens 71 is removed.

As apparent from the description herein, the main control unit 98 of the projector 10 according to this embodiment does not allow the support and drive unit to switch the condition of the mounted lens 71 from the normal condition to the shift condition when the mounted lens 71 attached to the support and drive unit 72 is the non-shift type. In this case, inappropriate lens shift of the non-shift type mounted lens 71 is not executed, and thus problems such as darkness and loss of the periphery of the projection image are not caused. Moreover, the main control unit 98 of the projector 10 in this embodiment switches the condition of the mounted lens 71 from the shift condition to the normal condition when determining that the mounted lens 71 as the non-shift type is positioned in the shift condition. By this method, the mounted lens 71 as the non-shift type can be forced to return to the proper normal condition, and thus the function for maintaining the operation of the projector 10 in an appropriate condition can be improved.

The invention is not limited to the embodiment described herein, but may be practiced otherwise without departing from the scope and spirit of the invention. For example, the following modifications may be made.

According to this embodiment, the determination of the type of the mounted lens 71 (the shift type or the non-shift type) is made based on whether the first and the second terminals 75a and 75b of the mounted lens 71 are opened or not. It is also possible, however, to provide three or more terminals and read information concerning the lens specifications such as the type of the mounted lens 71 (the shift type or the non-shift type) by the combination of the open condition and the short-circuit condition of the three or more terminals. Alternatively, it is possible to provide a communication connector in place of the first and second terminals 75a and 75b and connect a memory element extended from the communication connector to the mounted lens 71. In this case, the main control unit 98 can determine that the mounted lens 71 is the non-shift type when data cannot be read from the memory element of the mounted lens 71.

When the information concerning the lens specifications and the like is stored in the memory element of the mounted lens 71 discussed above, lens shift allowed only within the range corresponding to the specifications and the like of the mounted lens 71 can be performed. More specifically, when the mounted lens 71 is determined as the projection lens of a type having a large allowable shift range according to the detection information from the lens sensor 72f, the main control unit 98 sets the shift amount of the mounted lens 71 provided by the support and drive unit 72 at a large amount. On the other hand, when the mounted lens 71 is determined as the projection lens of a type having a small allowable shift range according to the detection information from the lens sensor 72f, the main control unit 98 sets the shift amount of the mounted lens 71 provided by the support and drive unit 72 at a small amount to maintain the projection direction within a proper range. In this case, appropriate lens shift corresponding to the specifications of the mounted lens 71 such as the angle of view and the focal distance can be achieved.

While the mounted lens 71 has been positioned in the one shift condition in this embodiment for simplifying the explanation, the mounted lens 71 may be positioned in plural steps of conditions or in continuously variable shift conditions. That is, lens shift capable of varying the projection direction of the mounted lens 71 gradually or continuously can be achieved. In this case, the main control unit 98 similarly suspends positioning of the non-shift type mounted lens 71 in the shift condition, and returns the non-shift type mounted lens 71 to the normal condition.

According to this embodiment, the mounted lens 71 has the zooming and focusing functions. However, the mounted lens 71 not having these functions can switch between the shift condition and the normal condition as long as the mounted lens 71 is suited for lens shift. Similarly, when the non-shift type mounted lens 71 not having the zooming and focusing functions is attached, the condition of the mounted lens 71 is maintained in the normal condition without being switched to the shift condition.

According to this embodiment, the mounted lens 71 attached to the up-down shift member 73 is shifted in the up-down direction (±Y direction) by the support and drive unit 72. However, the mounted lens 71 can be moved in the left-right direction (±X direction) by the support and drive unit 72. That is, the projector 10 capable of achieving lens shift in both the left-right direction and/or the up-down direction can be produced. In this case, the main control unit 98 does not allow the support and drive unit 72 to position the mounted lens 71 as the non-shift type in the shift condition in the up-down and left-right directions similarly to the above cases, and returns the mounted lens 71 to the normal condition on the system optical axis SA.

According to this embodiment, the specific example of the main optical device 11 which includes the light source lamp unit 21, the equalizing system 23, the color separation and light guide system 40, the light modulation unit 50, the cross dichroic prism 60, and the projection unit 70 has been described. However, the invention is not limited to this structure. For example, while the light modulation unit 50 has the transmission type liquid crystal light valves 51a, 51b, and 51c in this embodiment, the invention is applicable to a projector including reflection type liquid crystal light valves. The "reflection type" herein refers to a type which includes a liquid crystal light valve for reflecting light. Moreover, while the light modulation unit 50 includes the three liquid crystal light valves 51a, 51b, and 51c in this embodiment, the invention is applicable to a projector which includes one or a larger arbitrary number of liquid crystal light valves.

According to this embodiment, the main optical device 11 modulates lights in respective colors by using the color separation and light guide system 40, the liquid crystal light valves 51a, 51b, and 51c, and others. However, the lights can be modulated and combined into color light by using a combination of a color wheel illuminated by the illumination device 20 and a device (light valve) which contains micromirror pixels and receives lights transmitted from the color wheel in place of the color separation and light guide system 40 and the liquid crystal light valves 51a, 51b, and 51c.

There are two types of projector: a front projection type projector which projects images in the projection surface viewing direction, and a rear projection type projector which projects images in the direction opposite to the projection surface viewing direction. The structure of the projector shown in FIG. 1 and other figures is applicable to both of the projector types. Some projectors are used both as the rear projection type and as the front projection type. When these projectors are used as the rear projection type, the projectors have the non-shift type specification which fixes the replaceable lens to the normal position in most cases. In this case, the problems of darkness in the peripheral area of the projection image can be easily prevented.

The entire disclosure of Japanese Patent Application No. 2009-024572, filed Feb. 5, 2009 is expressly incorporated by reference herein.

What is claimed is:

1. A projector comprising:
a light source;
a light valve configured to modulate light emitted from the light source according to image information to form image light;
a projection lens that projects the image light formed by the light valve;
a support and drive unit configured to support the projection lens such that the projection lens can be replaced, the support and drive unit being further configured to switch between (a) a shift condition for disposing the projection lens in such a position that the projection lens shifts in a first direction within a plane perpendicular to a system optical axis of the entire projector, and (b) a normal condition for disposing the projection lens in such a position that the projection lens lies on the system optical axis; and
a control unit configured to determine the type of the projection lens between a shift type designed so as to control a projection direction of a projection image by shifting in the first direction and a non-shift type not designed so as to control the projection direction, the control unit being further configured to control supporting of the support and drive unit according to the determination of the type of the projection lens.

2. The projector according to claim 1, wherein:
in the case that the projection lens is the non-shift type, the control unit controls the support and drive unit to support the projection lens in the normal condition.

3. The projector according to claim 1, wherein:
in the case that the projection lens is the shift type, the control unit controls the support and drive unit to support the projection lens in the shift condition.

4. The projector according to claim 1, wherein:
in the case that the projection lens is removed, the control unit controls the support and drive unit to return the projection lens to the normal condition.

5. The projector according to claim 1, wherein:
the projection lens has information concerning an allowable range of the shift in the first direction, the control unit controls the support and drive unit to support to shift the projection lens within the determined allowable range according to the information.

6. The projector according to claim 1, wherein:
the determination of the type of the projection lens between the shift type or the non-shift type is based on information obtained from the projection lens.

7. The projector according to claim 2, wherein:
in the case that the projection lens is in the shift condition, the control unit causes the support and drive unit to switch the condition of the projection lens from the shift condition to the normal condition.

8. The projector according to claim 2, wherein:
in the case that the projection lens is in the normal condition, the control unit causes the support and drive unit not to switch the condition of the projection lens to the shift condition.

9. The projector according to claim 6, wherein:
the support and drive unit has electric connector which connect to the projection lens, the control unit determining the type of the projection lens between the shift type and the non-shift type based on an electric condition of the electric connector.

* * * * *